(12) United States Patent
Jiang et al.

(10) Patent No.: US 9,886,406 B2
(45) Date of Patent: Feb. 6, 2018

(54) ELECTRONIC DEVICE AND DETECTING METHOD

(71) Applicant: Acer Inc, New Taipei (TW)

(72) Inventors: Shu-Yu Jiang, New Taipei (TW); Yung-Sen Lin, New Taipei (TW)

(73) Assignee: Acer Inc., New Taipei (TW)

( * ) Notice: Subject to any disclaimer, the term of this patent is extended or adjusted under 35 U.S.C. 154(b) by 432 days.

(21) Appl. No.: 14/523,989

(22) Filed: Oct. 27, 2014

(65) Prior Publication Data

US 2015/0317227 A1    Nov. 5, 2015

(30) Foreign Application Priority Data

Apr. 30, 2014 (TW) ............................. 103115452 A (51) Int. Cl.
*G06F 13/40* (2006.01)
*G06F 11/30* (2006.01)
*G06F 9/44* (2006.01)

(52) U.S. Cl.
CPC ............ *G06F 13/40* (2013.01); *G06F 9/4411* (2013.01); *G06F 9/4418* (2013.01); *G06F 11/30* (2013.01); *G06F 11/3027* (2013.01); *G06F 13/4068* (2013.01)

(58) Field of Classification Search
CPC ............. G06F 13/4022; G06F 13/4221; G06F 13/4004; G06F 13/4282; G06F 13/4027; G06F 13/4068; G06F 13/40; G06F 11/3027; G06F 11/30; G06F 9/4418
See application file for complete search history.

(56) References Cited

U.S. PATENT DOCUMENTS

| 8,966,136 | B2 | 2/2015 | Sip |
| 2006/0031654 | A1 | 2/2006 | Liang |
| 2014/0013024 | A1* | 1/2014 | Lamm ................... H01R 27/02 710/313 |
| 2014/0047145 | A1 | 2/2014 | Sip |
| 2014/0052883 | A1 | 2/2014 | Sip |

FOREIGN PATENT DOCUMENTS

| CN | 102339264 A | 2/2012 |
| CN | 103473194 A | 12/2013 |

* cited by examiner

*Primary Examiner* — Ernest Unelus
(74) *Attorney, Agent, or Firm* — Alan D. Kamrath; Kamrath IP Lawfirm, P.A.

(57) ABSTRACT

A detecting method for determining either a first expansion bus interface or a second expansion bus interface of an expansion device of an electronic device is applied for implementing a signal communication with a control unit. The detecting method includes the following steps: turning on the first expansion bus interface; detecting whether the control unit transmits a feedback signal after the first expansion bus interface is turned on; if not, turning on the second expansion bus interface; detecting whether the control unit transmits the feedback signal after the second expansion bus interface is turned on; and if yes, implementing the signal communication between the expansion device and the control unit through the second expansion bus interface to complete a boot up procedure.

9 Claims, 7 Drawing Sheets

ELECTRONIC DEVICE AND DETECTING METHOD

BACKGROUND OF THE DISCLOSURE

1. Field of the Disclosure

The present invention relates to a detecting method for determining which types of expansion bus interfaces of an expansion device are applied for implementing a signal communication with a control unit.

2. Description of the Related Art

In recent years, electronic devices such as laptops, tablets, or mobile phones have been equipped with multiple input/output modules and functional modules, such as keyboards, mouses, hard drives, network interface cards, and other types of interface cards. Each module transmits data to a central processing unit (CPU) of an electronic device through a Platform Controller Hub (PCH). For the sake of compatibility with different modules having various specifications, the platform control unit provides various expansion buses to implement the data transmission with the CPU.

Nowadays, the majority of the above-mentioned modules support two or more than two types of expansion buses at the same time in order to be compatible with the various expansion buses in motherboards. For example, a module may support a PCIe expansion bus interface, and an SDIO expansion bus interface can be configured with a motherboard that only supports a PCIe expansion bus or an SDIO expansion bus. However, if a module with multiple expansion bus interfaces is configured with a motherboard having a single expansion bus, in order to be compatible with the expansion bus of the motherboard, the module has to pre-determine a default implementing expansion bus through its hardware configuration. Thus, it is necessary to consider the above-mentioned hardware configuration during the manufacturing stage, which not only increases the material cost but also wastes time.

SUMMARY OF THE DISCLOSURE

It is an object of the present invention to provide a detecting method for determining which expansion bus interface of an expansion device is applied for implementing a signal communication with a control unit.

It is another object of the present invention to provide an electronic device for implementing the above-mentioned detecting method.

To achieve the above-mentioned objects, the detecting method of the present invention, which is used for determining either a first expansion bus interface or a second expansion bus interface of an expansion device of an electronic device, is applied for implementing a signal communication with a control unit when the electronic device is turned on. The detecting method comprises the following steps: turning on the first expansion bus interface; detecting whether the control unit transmits a feedback signal after the first expansion bus interface is turned on; if not, turning on the second expansion bus interface; detecting whether the control unit transmits the feedback signal after the second expansion bus interface is turned on; if yes, implementing a signal communication between the expansion device and the control unit through the second expansion bus interface to complete a boot up procedure.

The electronic device of the present disclosure comprises a processing unit, a control unit, and an expansion device. The control unit is coupled to the processing unit, and the control unit provides a first expansion bus or a second expansion bus. The expansion device is coupled to the control unit through the first expansion bus or the second expansion bus. The expansion device comprises a first expansion bus interface, a second expansion bus interface, and a control system. The control system comprises an enable module, a detecting module, and an execution module. The enable module is used for turning on the first expansion bus interface or the second expansion bus interface. The detecting module is used for detecting whether the control unit transmits a feedback signal after the first expansion bus interface or the second expansion bus interface is turned on. The execution module is used for implementing a signal communication between the expansion device and the control unit through the first expansion bus interface when the feedback signal is transmitted from the control unit after the first expansion bus interface is turned on, or for implementing the signal communication between the expansion device and the control unit through the second expansion bus interface when the feedback signal is transmitted from the control unit after the second expansion bus interface is turned on.

DETAILED DESCRIPTION OF THE PREFERRED EMBODIMENTS

To facilitate understanding and to clarify the objects, characteristics, and advantages of the present invention, the following three specific embodiments and figures illustrating the present invention are presented as a detailed description.

Figure 1:
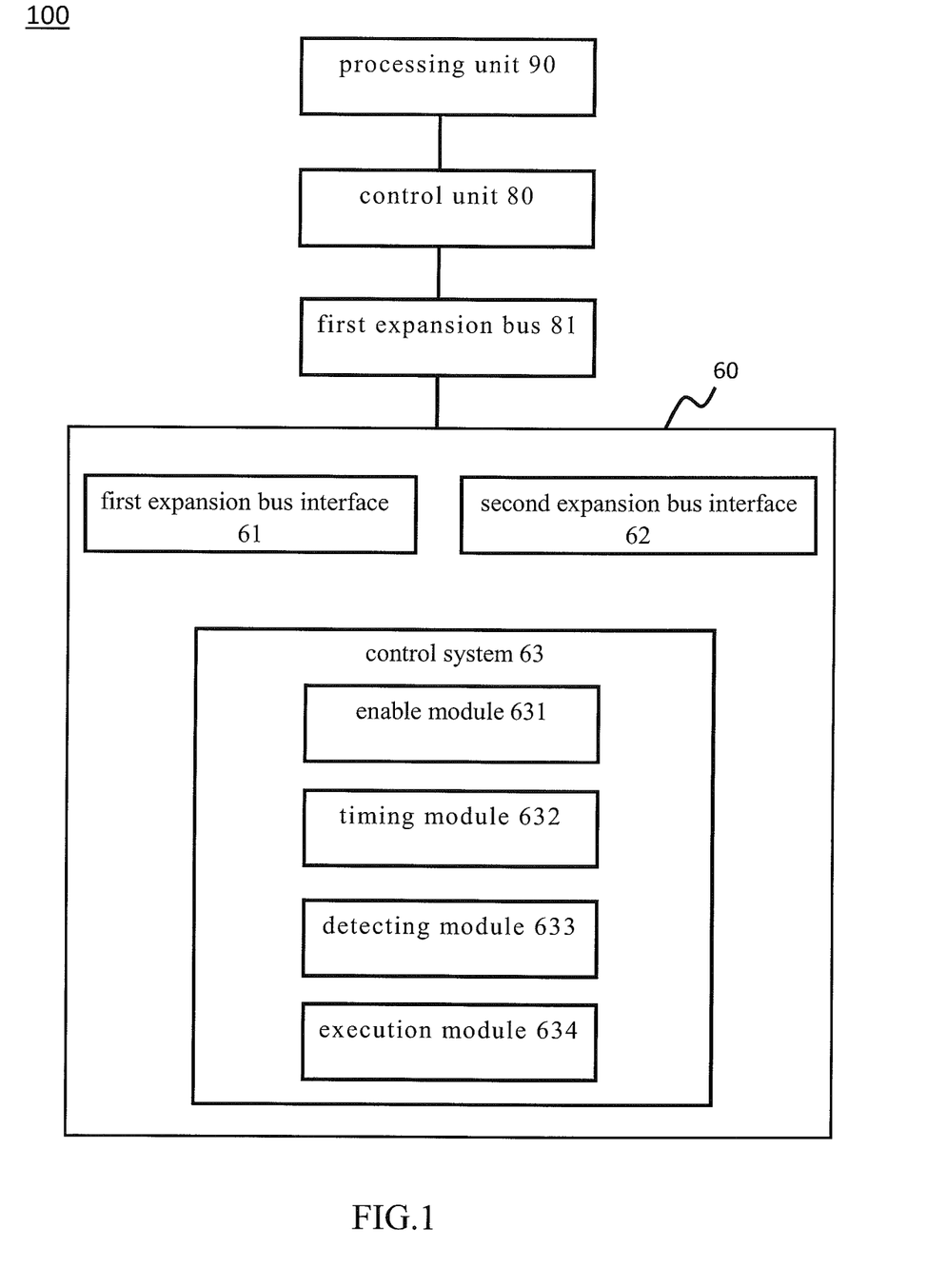
FIG. 1 is a first hardware structure of the first embodiment of the electronic device of the present invention.
Figure 2:
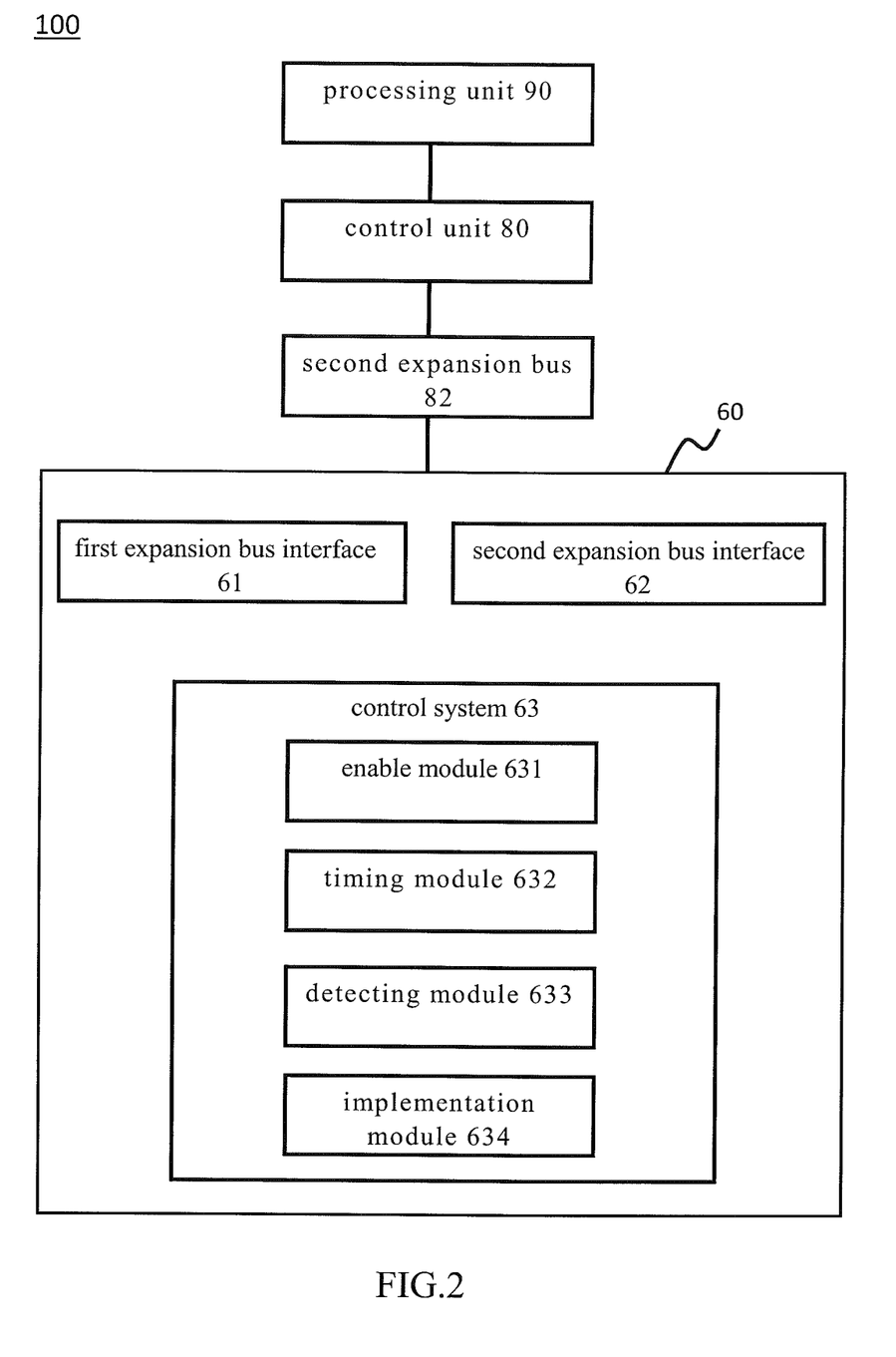
FIG. 2 is a second hardware structure of the first embodiment of the electronic device of the present invention.

Please refer to FIG. 1 and FIG. 2, which illustrate the hardware structures of the first embodiment of the electronic device of the present invention.

As shown in FIG. 1 and FIG. 2, according to one embodiment of the present invention, the electronic device 100 of the present invention comprises a processing unit 90 (such as a Central Processing Unit), a control unit 80, and an expansion device 60. According to one embodiment of the present invention, the electronic device 100 can be a personal computer, a laptop, or a smart phone. However, the present invention is not limited to the abovementioned embodiments.

The control unit 80 is coupled to the processing unit 90. The control unit 80 provides a first expansion bus 81 (as shown in FIG. 1) or a second expansion bus 82 (as shown in FIG. 2) for allowing the control unit 80 to be coupled to the expansion device 60 with various expansion bus interfaces there through. According to a preferred embodiment of the present invention, the control unit 80 is a Platform Controller Hub (PCH), the first expansion bus 81 is a PCI Express (PCIe) expansion bus, and the second expansion bus 82 is an SDIO expansion bus. It is noted that the present invention is not limited to the abovementioned embodiment.

The expansion device 60 comprises a first expansion bus interface 61, a second expansion bus interface 62, and a control system 63. According to one preferred embodiment of the present invention, the first expansion bus interface 61 is a PCI Express (PCIe) expansion bus interface, and the second expansion bus interface 62 is an SDIO expansion bus interface. However, the present invention is not limited to these embodiments. The expansion device 60 executes the first expansion bus interface 61 or the second expansion bus interface 62 to implement a signal and data communication with the control unit 80 through the first expansion bus 81 or the second expansion bus 82. As shown in FIG. 1, when the expansion device 60 is coupled to the control unit 80, which provides only the first expansion bus 81, the expansion device 60 has to execute the first expansion bus interface 61 for implementing the signal communication and data transmission with the control unit 80 through the first expansion bus 81. On the other hand, taking FIG. 2 as an example, when the expansion device 60 is coupled to the control unit 80, which provides only the second expansion bus 82, the expansion device 60 has to execute the second expansion bus interface 62 for implementing the signal communication and data transmission with the control unit 80 through the second expansion bus 82. In a preferred embodiment, the expansion device 60 can be a wired or wireless device, such as a network interface card or a blue-tooth wireless communication device. It is further noted that, although the expansion device 60 of the present invention provides two different types of expansion bus interfaces, the expansion bus interfaces supported by the expansion device 60 are not limited to the abovementioned expansion bus interfaces. In addition, the expansion bus interfaces provided by the expansion device 60 are not limited to the PCIe expansion bus interface and the SDIO expansion bus interface.

The control system 63 is used for detecting the types of expansion buses that the control unit 80 provides and then determining which of either the first expansion bus interface 61 or the second expansion bus interface 62 will implement the signal communication between the expansion device 60 and the control unit 80 when the electronic device 100 is turned on. As shown in FIG. 1 and FIG. 2, in the first embodiment of the present invention, the control system 63 comprises an enable module 631, a timing module 632, a detecting module 633, and an execution module 634. In a preferred embodiment, the abovementioned modules are all presented in firmware. However, the present invention is not limited to this embodiment. The above-mentioned modules can be configured as hardware devices, software, circuit loops, or other suitable formats. Furthermore, each of the above-mentioned modules can be configured individually or presented in combination with each other.

In the first embodiment of the present invention, the enable module 631 is used for turning on the first expansion bus interface 61 or the second expansion bus interface 62. The timing module 632 is used for timing a predetermined amount of time after the first expansion bus interface 61 or the second expansion bus interface 62 is turned on. The detecting module 633 is used for detecting whether the control unit 80 transmits a feedback signal within the predetermined amount of time after the first expansion bus interface 61 or the second expansion bus interface 62 is turned on. The execution module 634 is used for executing the first expansion bus interface 61 to implement the signal communication between the expansion device 60 and the control unit 80 when the control unit 80 transmits the feedback signal after the first expansion bus interface 61 is turned on, or the execution module 634 is used for executing the second expansion bus interface 62 to implement the signal communication between the expansion device 60 and the control unit 80 when the control unit 80 transmits the feedback signal after the second expansion bus interface 62 is turned on.

Figure 3:
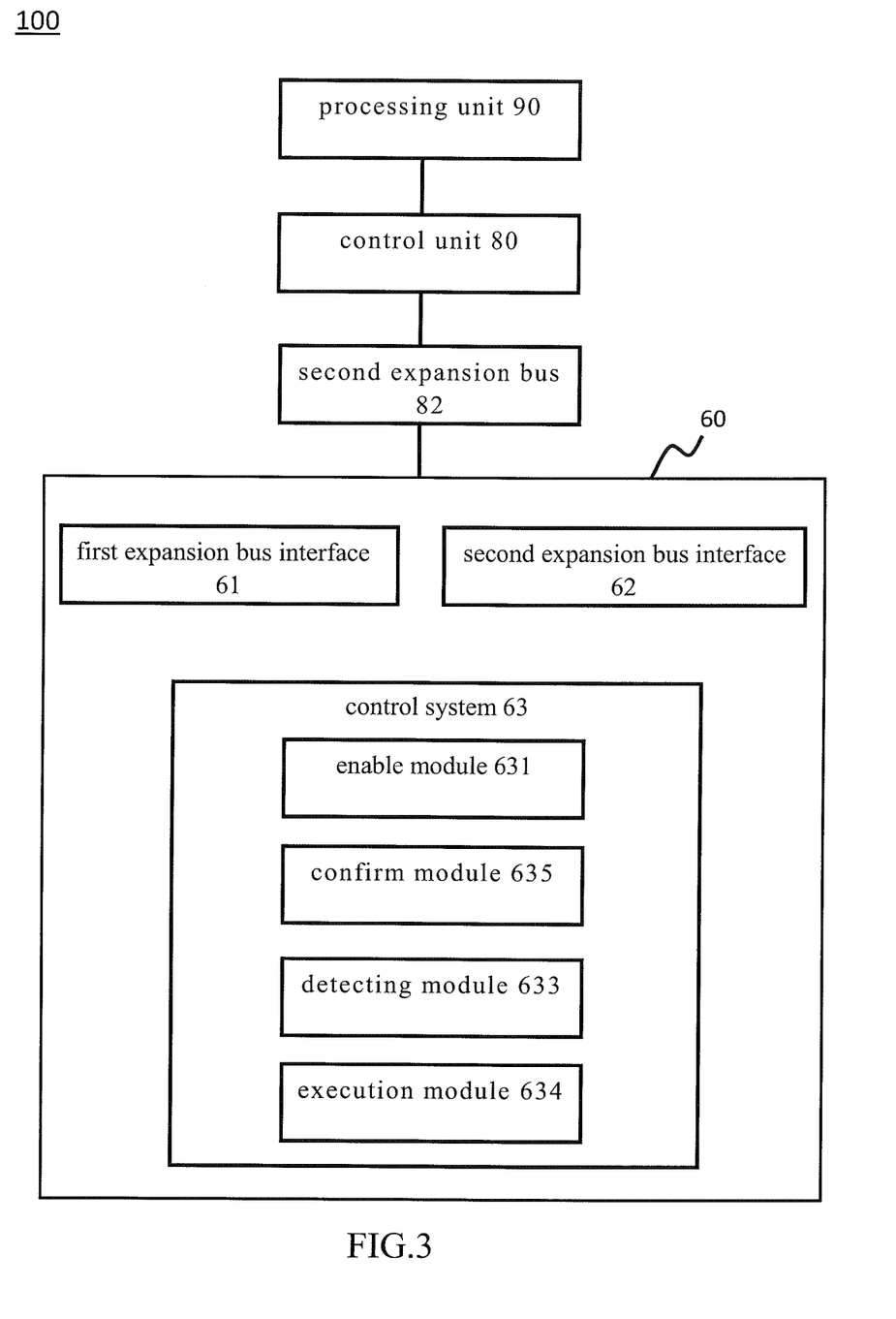
FIG. 3 is the hardware structure of the second embodiment of the electronic device of the present invention.

Please refer to FIG. 3, which illustrates the hardware structure of the second embodiment of the electronic device of the present invention.

As shown in FIG. 3, the difference between the second embodiment of the present invention and the first embodiment is that the control system 63 of the electronic device 90 comprises an enable module 631, a confirm module 635, a detecting module 633, and an execution module 634. The confirm module 635 is used for sending a confirm signal after the first expansion bus interface 61 or the second expansion bus interface 62 is turned on by the enable module 631. The detecting module 633 detects whether the control unit 80 transmits a corresponding feedback signal after the confirm signal is sent.

Figure 4:
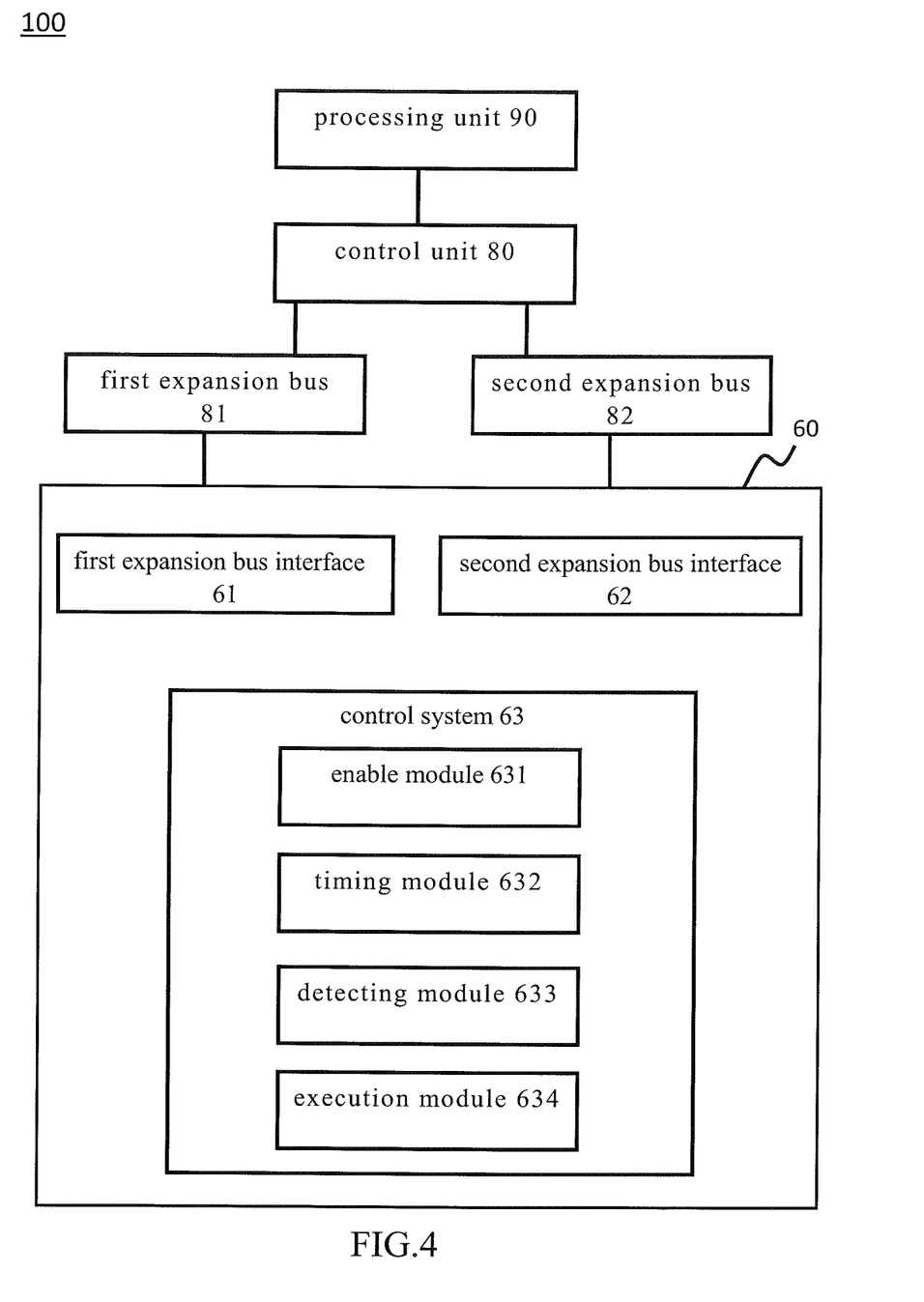
FIG. 4 is the hardware structure of the third embodiment of the electronic device of the present invention.

Please refer to FIG. 4, which illustrates the hardware structure of the third embodiment of the electronic device of the present invention.

As shown in FIG. 4, the difference between the third embodiment of the present invention and the abovementioned embodiments is that the control unit 80 provides both the first expansion bus 81 and the second expansion bus 82. When the expansion device 60 executes the first expansion bus interface 61, the signal communication and data transmission between the expansion device 60 and the control unit 80 are implemented through the first expansion bus 81. When the expansion device 60 executes the second expansion bus interface 62, the signal communication and data transmission between the expansion device 60 and the control unit 80 are implemented through the second expansion bus 82. When the control system 63 detects that the control unit 80 provides both the first expansion bus 81 and the second expansion bus 82, the expansion device 60 is requested by the control unit 80, either by setting or by the needs of the control unit 80, to only execute the first expansion bus interface 61 or the second expansion bus interface 62, or to execute both the first expansion bus interface 61 and the second expansion bus interface 62 at the same time.

Figure 5:
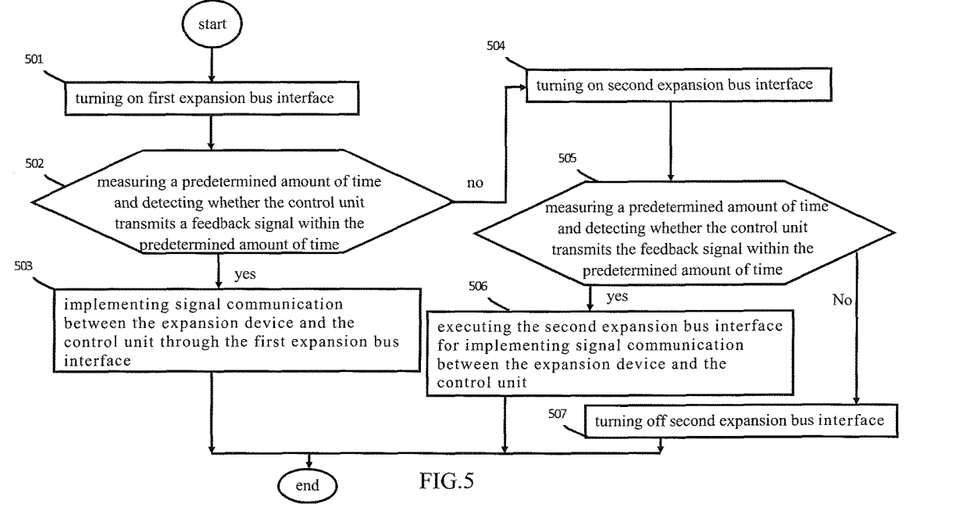
FIG. 5 is a flowchart of the first embodiment of the detecting method of the present invention.

Please refer to FIG. 5 together with FIG. 1 and FIG. 2, FIG. 5 is a flowchart of the first embodiment of the detecting method of the present invention. Descriptions of the steps of the first embodiment of the detecting method are presented in conjunction with FIG. 1 and FIG. 2. It is noted that, although the control system 63 is applied for illustrating the preferred embodiment of the present invention, the detecting method of the present invention is not limited to the above-mentioned control system 63.

First is step 501: turning on a first expansion bus interface.

As shown in FIG. 1, when the power of the electronic device 100 is turned on, the first expansion bus interface 61 or the second expansion bus interface 62 is also turned on for implementing the signal communication and data transmission between the expansion device 60 and the control unit 80 through the first expansion bus 81 or the second expansion bus 82. Thus, in the present embodiment, when the power of the electronic device 100 is turned on, and due to the default setting of the enable module 631, the first expansion bus interface 61 is the first one to be turned on to attempt the signal communication with the control unit 80 through the first expansion bus interface 61.

Next is step 502: measuring a predetermined amount of time and detecting whether the control unit transmits a feedback signal within the predetermined amount of time.

As shown in FIG. 1, after the first expansion bus interface 61 is turned on, the timing module 632 starts measuring a predetermined span of time and the detecting module 633 detects whether the control unit 80 transmits the feedback signal within the predetermined span of time. If the feedback signal transmitted from the control unit 80 is detected by the detecting module 633, step 503 is implemented. Otherwise, step 504 is implemented. According to one embodiment of the present invention, the predetermined amount of time ranges from several milliseconds to several hundred milliseconds. However, the present invention is not limited to this.

Next is step 503: implementing a signal communication between the expansion device and the control unit through the first expansion bus interface.

As shown in FIG. 1, when the control unit 80 provides the first expansion bus 81 and when the first expansion bus interface 61 is also turned on by the expansion device 60, the feedback signal from the control unit 80 is transmitted to the expansion device 60 through the first expansion bus 81. Once the feedback signal from the control unit 80 is detected by the detecting module 633 within the predetermined amount of time, it is confirmed that the control unit 80 provides the first expansion bus 81. Thus, the execution module 634 executes the first expansion bus interface 61 to implement the signal communication between the expansion device 60 and the control unit 80 through the first expansion bus interface 61 and the first expansion bus 81, and a boot up procedure can be completed afterwards. After the boot up procedure is completed, the first expansion bus interface 61 is employed as the transmission interface between the expansion device 60 and the control unit 80, such that data transmission between the expansion device 60 and the control unit 80 is implemented through the first expansion bus 81.

As shown in FIG. 2, if the control unit 80 provides only the second expansion bus 82, the feedback signal from the control unit 80 cannot be transmitted to the expansion device 60 through the expansion bus within the predetermined amount of time; i.e., the feedback signal from the control unit 80 cannot be detected by the detecting module 633. Therefore, once the feedback signal cannot be detected by the detecting module 633 within the predetermined amount of time, it is confirmed that the control unit 80 does not provide the first expansion bus 81. Consequently, the enable module 631 turns off the first expansion bus interface 61 and turns on the second expansion bus interface 62 instead for the signal communication with the control unit 80 through the second expansion bus interface 62.

Next is step 505: measuring a predetermined amount of time and detecting whether the control unit transmits the feedback signal within the predetermined amount of time.

Accordingly, after the second expansion bus interface 62 is turned on, the detecting module 633 detects whether the control unit 80 transmits the feedback signal within the predetermined amount of time. If the feedback signal is detected by the detecting module 633 within the predetermined amount of time, it is confirmed that the control unit 80 provides the second expansion bus 62. Then, step 506 is implemented to execute the second expansion bus interface 62 for implementing the signal communication between the expansion device 60 and the control unit 80 through the second expansion bus interface 62 and the second expansion bus 82. However, if the feedback signal is still not detected by the detecting module 633 within the predetermined amount of time, step 507 is implemented to turn off the second expansion bus interface 62.

Figure 6:
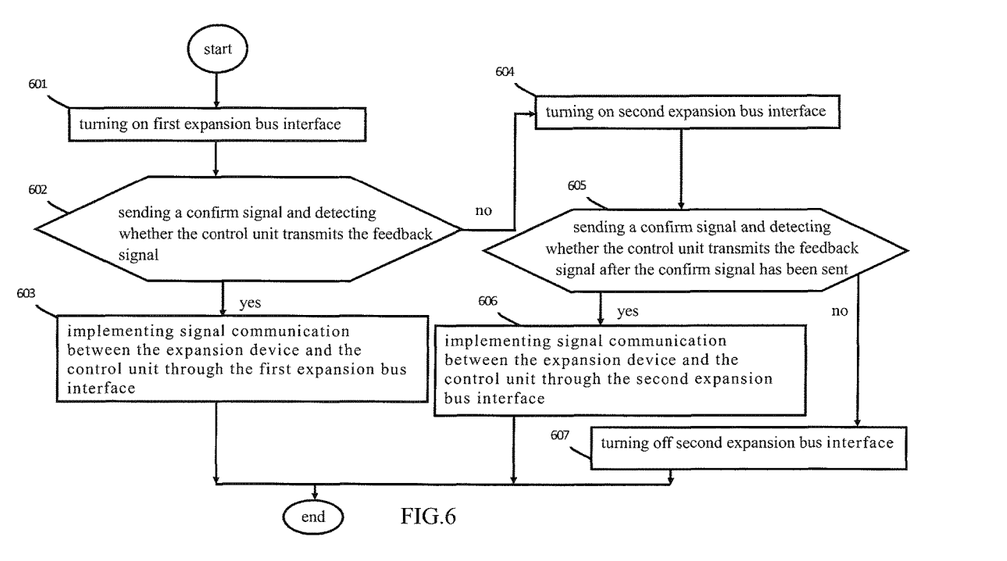
FIG. 6 is a flowchart of the second embodiment of the detecting method of the present invention.

Please refer to FIG. 6 together with FIG. 3. FIG. 6 is a flowchart of the second embodiment of the detecting method of the present invention. Descriptions of the steps of FIG. 6 are presented in conjunction with FIG. 3.

First is implementing step 601: turning on the first expansion bus interface.

As shown in FIG. 3, and as in the first embodiment, when the power of the electronic device 100 is turned on, the first expansion bus interface 61 is the first one to be turned on by the expansion device 60 to attempt the signal communication with the control unit 80 through the first expansion bus interface 61 due to the default setting of the enable module 631.

Next is step 602: sending a confirm signal and detecting whether the control unit transmits the feedback signal.

As shown in FIG. 3, after the first expansion bus interface 61 is turned on, the confirm module 635 sends the confirm signal to attempt the signal communication with the control unit 80 through the first expansion bus interface 61. After the confirm signal is sent, the detecting module 633 detects whether the control unit 80 transmits a corresponding feedback signal. If the feedback signal transmitted from the control unit 80 is detected, step 603 is implemented. Otherwise, step 604 is implemented.

Next is step 603: implementing a signal communication between the expansion device and the control unit through the first expansion bus interface.

When the control unit 80 provides the first expansion bus 81 and the first expansion bus interface 61 is also turned on by the expansion device 60, the confirm signal sent by the confirm module 635 can be transmitted to the control unit 80 through the first expansion bus 81. After the control unit 80 receives the confirm signal, the control unit 80 transmits the feedback signal to the expansion device 60 through the first expansion bus 81. Once the feedback signal from the control unit 80 is detected by the detecting module 633, the execution module 634 executes the first expansion bus interface 61 to implement the signal communication with the control unit 80.

Next is step 604: turning on the second expansion bus interface.

On the other hand, as shown in FIG. 3, when the control unit 80 provides only the second expansion bus 82, the confirm signal sent by the expansion device 60 cannot be transmitted to the control unit 80 even when the first expansion bus interface 61 is turned on. Therefore, if the corresponding feedback signal is not detected within the predetermined amount of time after the confirm signal is sent, it is confirmed that the control unit 80 does not provide the first expansion bus 81. Thus, the first expansion bus interface 61 is turned off by the enable module 631, and the second expansion bus interface 62 is turned on instead for the signal communication with the control unit 80 through the second expansion bus interface 62.

Next is step 605: sending a confirm signal and detecting whether the control unit transmits the feedback signal after the confirm signal is sent.

After the second expansion bus interface 62 is turned on, the confirm module 635 also sends the confirm signal to attempt the signal communication with the control unit 80 through the second expansion bus interface 62.

Next is step 606: implementing the signal communication between the expansion device and the control unit through the second expansion bus interface.

As shown in FIG. 3, when the control unit 80 provides the second expansion bus 82, the confirm signal is transmitted to the control unit 80 through the second expansion bus 82. After the confirm signal is received by the control unit 80, the feedback signal from the control unit 80 is transmitted to the expansion device 60 through the second expansion bus 82. Thus, the feedback signal can be detected by the detecting module 633. Once the feedback signal from the control unit 80 is detected, the execution module 634 executes the second expansion bus interface 62 for implementing the signal communication between the expansion device 60 and the control unit 80 through the second expansion bus interface 62.

Next is step 607: turning off the second expansion bus interface.

On the other hand, when the second expansion bus interface 62 is turned on and the feedback signal is not detected after the confirm signal is sent, it is confirmed that the control unit 80 does not provide the second expansion bus 82. As a result, the second expansion bus interface 62 is turned off accordingly.

Figure 7:
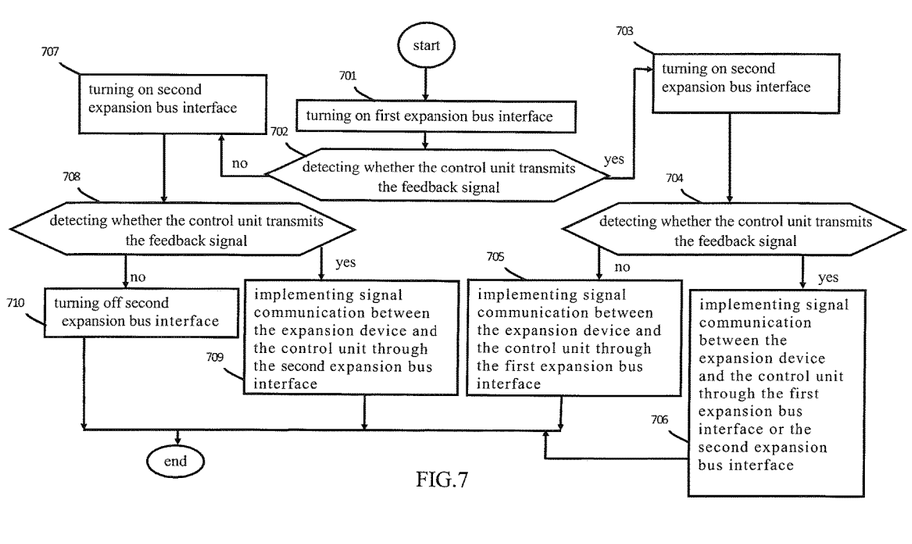
FIG. 7 is a flowchart of the third embodiment of the detecting method of the present invention.

Please refer to FIG. 7 together with FIG. 4. FIG. 7 is a flowchart of the third embodiment of the detecting method of the present invention. Descriptions of steps of FIG. 7 are presented in conjunction with FIG. 4.

First is implementing step 701: turning on the first expansion bus interface.

As in the above-mentioned embodiments, in the third embodiment of the present invention, the default setting of the enable module 631 is to turn on the first expansion bus interface 61 first to attempt to implement the signal communication between the expansion device 60 and the control unit 80 through the first expansion bus interface 61.

Next is step 702: detecting whether the control unit transmits the feedback signal.

After the first expansion bus interface 61 is turned on, the detecting module 633 detects whether the control unit 80 transmits the feedback signal. In the third embodiment of the present disclosure, the detecting method is the same as that in the first embodiment, based on time; i.e., the detecting module 633 detects whether the control unit 80 transmits the feedback signal within the predetermined amount of time. On the other hand, the detecting method in the third embodiment also can be the same as that of the second embodiment; i.e., the detecting module 633 detects whether the control unit 80 transmits the feedback signal after the confirm signal is sent. However, the detecting method of the present invention is not limited to the above-mentioned embodiments.

Next is step 703: turning on the second expansion bus interface.

The difference between the third embodiment and the above-mentioned first and second embodiments is that, in the third embodiment, even if the feedback signal transmitted from the control unit 80 is detected after the first expansion bus interface 61 is turned on, the expansion device 60 does not have to execute the first expansion bus interface 61. Instead, the expansion device 60 will turn off the first expansion bus interface 61 and turn on the second expansion bus interface 62 to test whether the expansion device 60 can implement the signal communications with the control unit 80 through the second expansion bus interface 62.

Next is step 704: detecting whether the control unit transmits the feedback signal.

As in the other embodiments, after the second expansion bus interface 62 is turned on, the detecting module 633 still detects whether the control unit 80 transmits the feedback signal.

Next is step 705: implementing signal communication between the expansion device and the control unit through the first expansion bus interface.

When the feedback signal is detected by the detecting module 633 after the first expansion bus interface 61 is turned on and the feedback signal is not detected after the second expansion bus interface 62 is turned on, it is confirmed that the control unit 80 provides only the first expansion bus 81. Therefore, the execution module 634 executes the first expansion bus interface 61 for implementing the signal communication between the expansion device 60 and the control unit 80 through the first expansion bus interface 61.

Next is step 706: implementing signal communication between the expansion device and the control unit through the first expansion bus interface or the second expansion bus interface.

When the feedback signal is detected by the detecting module 633 after the first expansion bus interface 61 is turned on and the feedback signal is also detected by the detecting module 633 after the second expansion bus interface 62 is turned on, it is confirmed that the control unit 80 provides both the first expansion bus 81 and the second expansion bus 82 (as shown in FIG. 4). Thus, the expansion device 60 is requested by the control unit 80, either by a default setting or by the needs of the control unit 80, to execute only the first expansion bus interface 61 or the second expansion bus interface 62, or to execute both the first expansion bus interface 61 and the second expansion bus interface 62 at the same time.

Next is step 707: turning on the second expansion bus interface.

When the feedback signal is not detected by the detecting module 633 in step 702, it means that the control unit 80 does not provide the first expansion bus 81. Therefore, the enable module 631 turns off the first expansion bus interface 61 and turns on the second expansion bus interface 62 instead to test whether the control unit 80 transmits the feedback signal after the second expansion bus interface 62 is turned on; i.e., step 708 is implemented. If the feedback signal transmitted from the control unit 80 is detected after the second expansion bus interface 62 is turned on, it means that the control unit 80 provides the second expansion bus interface 62 and then implements step 709 to execute the second expansion bus interface 62 to implement the signal communication between the expansion device 60 and the control unit 80 through the second expansion bus interface 62. If the feedback signal transmitted from the control unit 80 is not detected after the second expansion bus interface 62 is turned on, step 710 is implemented for turning off the second expansion bus interface 62.

It is noted that the sequence of steps of the detecting method is not limited to the order described in the above-mentioned embodiments. As long as the object of the present invention is achieved, the order of the steps can be modified.

The detecting method described above is used for determining what types of expansion buses the control unit 80 provides, and, then, the expansion device 60 can execute the corresponding expansion bus interface according to the types of expansion buses that the control unit 80 provides. For example, when the control unit 80 provides a PCIe expansion bus, the expansion device 60 executes a PCIe expansion bus interface. As a result, the expansion device 60 with multiple expansion bus interfaces does not require that a default implemented expansion bus interface be pre-defined during the manufacturing stage through the hardware configuration, and the problems in the prior art are solved consequently.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A detecting method comprising:
   providing an expansion device of an electronic device including a first expansion bus interface, a second expansion bus interface and a control system having an enable module, a detecting module, and an execution module;
   providing a control unit:
   turning on the first expansion bus interface by the enable module;
   detecting whether the control unit transmits a feedback signal within a first measured predetermined amount of time after the first expansion bus interface is turned on;
   when the control until transmits the feedback signal within the first measured predetermined amount of time, implementing a signal communication between the expansion device and the control unit through the first expansion bus interface to complete a boot up procedure;
   when the control unit does not transmit a feedback signal within the first measured predetermined period of time, turning on the second expansion bus interface by the enable module;
   detecting whether the control unit transmits the feedback signal within a second measured predetermined period of time after the second expansion bus interface is turned on; and
   when the control until transmits the feedback signal within the second measured predetermined period of time, implementing a signal communication between the expansion device and the control unit through the second expansion bus interface to complete a boot up procedure.

2. The detecting method as claimed in claim 1, wherein when the control unit transmits the feedback signal after the first expansion bus interface is turned on, the method further comprises:
   implementing the signal communication between the expansion device and the control unit through the first expansion bus interface to complete the boot up procedure.

3. The detecting method as claimed in claim 2, wherein after the first expansion bus interface or the second expansion bus interface is turned on, the method further comprises:
   sending a confirm signal and detecting whether the control unit transmits the feedback signal after the confirm signal is sent.

4. The detecting method as claimed in claim 1, wherein when the control unit transmits the feedback signal after the first expansion bus interface is turned on, the detecting method further comprises:
   turning on the second expansion bus interface;
   detecting whether the control unit transmits the feedback signal after the second expansion bus interface is turned on;
   when yes, implementing the signal communication between the expansion device and the control unit through the first expansion bus interface or/and the second expansion bus interface to complete the boot up procedure.

5. The detecting method as claimed in claim 4, wherein after the first expansion bus interface or the second expansion bus interface is turned on, the method further comprises:
   sending a confirm signal and detecting whether the control unit transmits the feedback signal after the confirm signal is sent.

6. The detecting method as claimed in claim 4, wherein after the first expansion bus interface or the second expansion bus interface is turned on, the method further comprises:
   measuring a predetermined amount of time and detecting whether the control unit transmits the feedback signal within the predetermined amount of time.

7. An electronic device comprising:
   a processing unit;
   a control unit coupled to the processing unit and providing a first expansion bus and a second expansion bus; and
   an expansion device coupled to the control unit through the first expansion bus and the second expansion bus, with the expansion device comprising:
   a first expansion bus interface;
   a second expansion bus interface; and
   a control system coupled to the first expansion bus interface and the second expansion bus interface, with the control system detecting the first and second expansion buses and implementing a signal communication with the control unit, with the control system comprising:
   an enable module for turning on the first expansion bus interface and the second expansion bus interface;
   a detecting module for detecting whether the control unit transmits a feedback signal within a first measured predetermined period of time after the first expansion bus interface is turned on; and
   an execution module for implementing a signal communication between the expansion device and the control unit through the first expansion bus interface when the feedback signal is transmitted from the control unit within the first measured predetermined period of time after the first expansion bus interface is turned on, and when the feedback signal is not transmitted from the control unit within the first measured predetermined period of time implementing the signal communication between the expansion device and the control unit through the second expansion bus interface when the feedback signal is transmitted from the control unit within a second measured predetermined period of time after the second expansion bus interface is turned on.

8. The electronic device as claimed in claim 7, wherein the control system further comprises a confirm module for sending a confirm signal after the first expansion bus interface or the second expansion bus interface is turned on.

9. The electronic device as claimed in claim 8, wherein the control system further comprises a measuring module for measuring a predetermined amount of time after the first expansion bus interface or the second expansion bus interface is turned on.

\* \* \* \* \*